United States Patent
Bailey et al.

[15] 3,671,007
[45] June 20, 1972

[54] COATED SILICONE RUBBER MOLD

[72] Inventors: James L. Bailey, Dover; Franklin A. Rodgers, Brookline, both of Mass.

[73] Assignee: Polaroid Corporation, Cambridge, Mass.

[22] Filed: Dec. 7, 1970

[21] Appl. No.: 95,478

Related U.S. Application Data

[63] Continuation-in-part of Ser. No. 788,707, Jan. 3, 1969, Pat. No. 3,620,895.

[52] U.S. Cl. ............................249/114, 249/134, 117/5.1, 117/72, 264/338
[51] Int. Cl. ..............................................B29d 1/04
[58] Field of Search ...............249/114, 134; 117/5.1, 72; 264/338; 18/47 C

[56] References Cited

UNITED STATES PATENTS

| | | |
|---|---|---|
| 2,851,372 | 9/1958 | Kaplan et al. ......................117/72 X |
| 2,902,389 | 9/1959 | Keil ....................................117/72 |
| 2,979,420 | 4/1961 | Harper................................117/72 |
| 3,027,274 | 3/1962 | Huntington et al. .............117/72 X |
| 3,123,495 | 3/1964 | Carpenter et al. ...............117/72 |

OTHER PUBLICATIONS

Plastics World, October 1963. TP986.A1P7. pp. 14–15.

Primary Examiner—R. Spencer Annear
Attorney—Brown and Mikulka and Sheldon W. Rothstein

[57] ABSTRACT

A mold comprising a support, a silicone rubber layer of predetermined configuration and a layer of γ-aminopropyltriethoxysilane.

2 Claims, 5 Drawing Figures

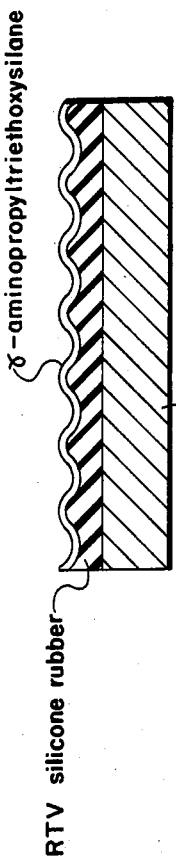
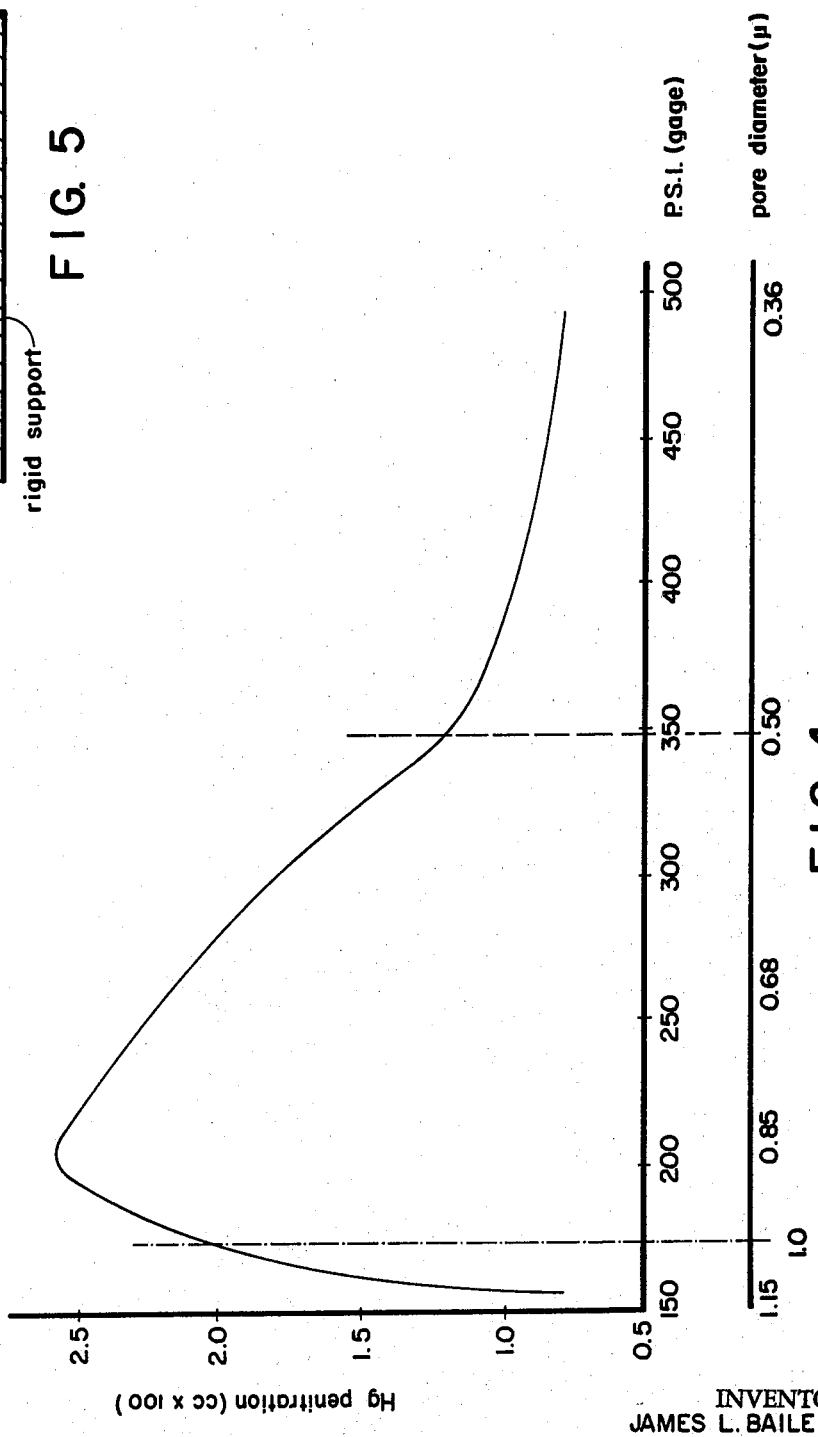

COATED SILICONE RUBBER MOLD

This application is a continuation-in-part of U.S. patent application Ser. No. 788,707, filed Jan. 3, 1969, in the names of James L. Bailey and Franklin A. Rodgers, now U.S. Pat. No. 3,620,895.

This invention is directed to casting films of polyvinylidene fluoride and, particularly, microporous films which may be utilized in water purification.

In a practical separation process directed toward the extraction of substantially pure water from an impure water solution, the energy required is related to the potentials causing transport of the extracted constituent from the solution.

In order to effect separation of impurities from a volume of nonpotable water it is necessary to physically separate the volume of water into aliquots of different concentrations of impurities. One practical approach to the problem is to use a membrane which is relatively more permeable either to pure water or to salts and other impurities which are to be removed from the original water charge. If, for example, sea water and pure water, both at the same pressure, are separated by a micropermeable membrane, the concentrations of the two liquids tend to equalize by passage through the membrane of impurity or water or both. If the membrane used is more permeable to pure water than impure water, the pure water will dilute the impure water. However, if a pure water migration stimulus is applied on the impure water side of the membrane, pure water will pass from the impure water solution to the pure water side at an appreciable rate. The energy required for this separation process may be supplied in the form of a hydrostatic head differential, wherein impure solution is delivered to the high pressure side of a membrane and is termed a reverse osmosis process; or in the form of a vapor pressure differential accomplished by a heating element which heats the impure solution and thereby raises the vapor pressure of the solvent of the impure solution substantially, termed a membrane distillation process; etc. The primary difference between the reverse osmosis process and the membrane distillation process is the fact that in the former, large hydrostatic pressure differentials are required which necessitates the use of a thick membrane of great strength, while in the latter process, the hydrostatic heads on both sides of the membrane are substantially equal—thereby allowing for the usage of a thinner, more fragile membrane which provides less impediment to solvent transport.

Microporous films anticipated by the present invention are particularly, but not exclusively, adapted for use in the distillation apparatus disclosed and claimed in U.S. Pat. No. 3,406,096. The distillation apparatus generally comprises means for transferring heat to a first body of liquid comprising a desired solvent (such as brackish water) to effect transfer of solvent as a vapor across a barrier to a second body of the same solvent from which heat is removed. The barrier is designed to separate the two bodies of liquid so that there is no liquid flow, or leakage, from one to the other, while allowing the vapor of the solvent to pass by diffusion from the evaporating liquid body, to which heat is transferred, to the condensing liquid body, from which heat is withdrawn. The operational efficiency of the apparatus may be greatly affected by the nature and quality of the barrier layer which is used. Preferably, the film barrier will comprise a thin sheet of microporous material having a multiplicity of microscopic through pores, or passages, of substantially uniform size which occupy the major portion of the total volume of the film. The pores should be of a maximum size which permit the passage of only the solvent vapor, and any gas dissolved therein substantially at its vapor pressure, without allowing the passage of the liquid. The major proportion of the pores should be of a maximum size to provide maximum efficiency with as few smaller sized pores as possible. The smaller sized pores are undesirable in that the vapor will not readily pass therethrough and thus, the overall vapor transmission per unit area of barrier material is proportionately decreased by their presence, thereby decreasing efficiency. Pores of a larger size are intolerable since they may allow the passage of liquid and thereby prevent the apparatus from efficiently performing its separation function. The material used in the formation of the film should be non-wettable by the particular liquid for which the apparatus is designed and/or employed, and have a thermal conductivity as small as possible, since heat-transfer between the bodies of liquid on opposite sides of the film should be restricted as much as possible to that resultant from vapor transfer, rather than by direct conduction of the film. For the purification and desalination of brackish water, it has been found that commercially available polymeric vinylidene fluoride may be formed into effective barrier elements for use in distillation apparatus as described above. A method for the manufacture of suitable films for use in the herein described separation environment is disclosed and claimed in the U.S. application, Ser. No. 790,192, filed Jan. 3, 1969, assigned to Polaroid Corporation which is a continuation-in-part of U.S. application Ser. No. 557,993, of James L. Bailey and Robert F. McCune, assigned to Polaroid Corporation filed June 16, 1966, now abandoned.

One of the basic processes used in the preparation of microporous films involves the admixture of a solvent solution of the film-forming material with a liquid, which is a non-solvent for the material and is miscible with the solvent, and forming the mixture into a film. This process is denoted the "solvent-non-solvent" process for forming microporous films. Many variations on the basic process are also known such as those shown in U.S. Pat. Nos. 1,421,231; 3,100,721; and 3,208,875. The "solvent-non-solvent" process is apparently based on the theory that a polymeric material dissolved in a solvent and cast into a film coalesces to form a film by the entanglement of polymer chains. Due to the solvent action of the solvent still remaining in the film at the time of coalescence, the polymer chains still have some freedom of movement so that the number of intanglements may be increased to render the film continuous and non-porous. By contacting the film-forming material with a non-solvent material which is miscible with the solvent present in said material either prior to or subsequent to the formation of the material into a wet film, the solvent action of the solvent is substantially decreased so as to limit chain entanglements and to thus provide formation of a porous polymeric matrix.

According to the above-mentioned Bailey and McCune application, a microporous film of polymeric vinylidene fluoride is provided having a pore volume of at least about 50 percent and preferably at least 60 percent wherein a majority and preferably at least about 75 percent of the pores have a pore diameter of from about 0.5 to about 2.0 microns and less than about 5 percent of the pores have a pore diameter greater than about 2.0 microns. This microporous film may be prepared by forming a solution of polymeric vinylidene fluoride in a solvent therefor, subjecting said solution to a predetermined maximum temperature to effect formation of a film having a given uniform pore size distribution, forming the solution into such a film, immersing the film in a bath of a liquid which is a non-solvent for the polymeric vinylidene fluoride and is miscible with the solvent, removing the film from the bath, and drying it. Preferably, the resultant microporous film is then baked, for a time sufficient to anneal it, at a temperature insufficient to fuse the polymeric vinylidene fluoride. According to the disclosure in the aforementioned Bailey and McCune application, the ultimate pore volume and pore size distribution may be controlled by the judicious selection of an appropriate maximum temperature to which the polyvinylidene fluoride solution is subjected prior to casting. It will be appreciated, therefore, that by adjusting the temperature within the range of 28° to 62° C. membranes having pore diameters with the above-denoted desired 0.5 to 2.0 micron range will be produced.

When films of the aforementioned type are utilized in the separation apparatus such as that disclosed in the above-denoted U.S. Pat. No. 3,406,096 any scaling occurring at the membrane surface upsets the flow pattern of circulating liquid and greatly decreases system efficiency, and reduces the average useful life of the separation membranes substantially.

It has been found quite unexpectedly, that adverse circulation problems due to scaling may be substantially obviated by utilizing a membrane possessing multiple convolutions on at least one side thereof, hereinafter referred to as a corrugated membrane. It is, accordingly, a primary purpose of the instant invention to provide a micropermeable membrane particularly adapted to be used in a distillation process for water purification.

It is another object of the present invention to produce a microporous corrugated membrane.

It is a further object of the present invention to provide a technique for the production of uniform membranes described in the paragraph next above.

It is another object of the present invention to provide a novel polyvinylidene fluoride membrane molding technique which produces a corrugated membrane.

It is a further object of the present invention to produce mold members which may be reused for the formation of polyvinylidene fluoride membranes wherein said mold members possess release characteristics which prevent premature peeling of the membrane from the mold member.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings.

FIG. 4 is a graphic illustration of the pore size distribution of the corrugated membrane of the present invention; and FIG. 5 is a cross-sectional view of a mold member prepared according to the present invention.

Figure 1:
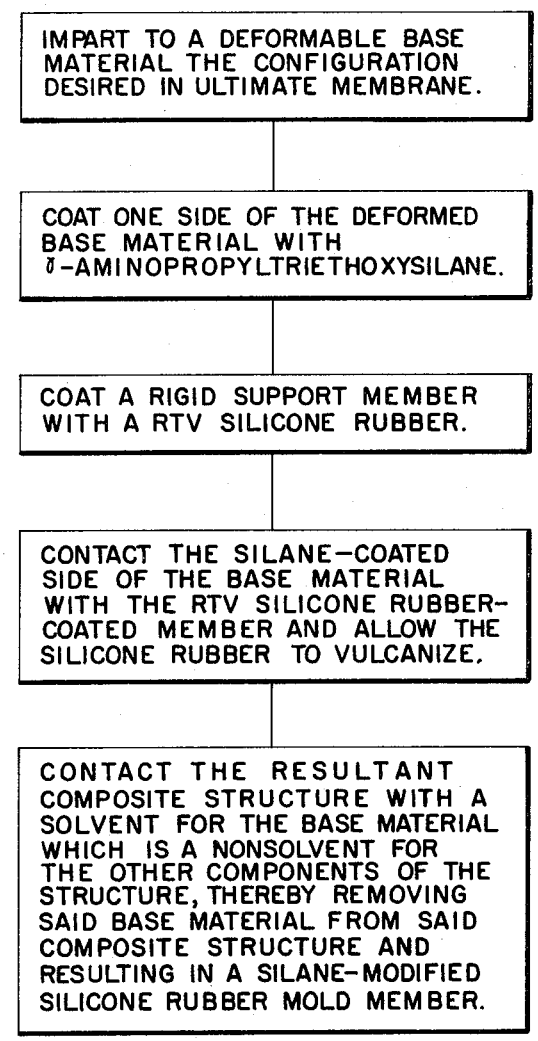
FIG. 1 is a flow diagram of the process of the present invention.

As has been stated above, in order to achieve satisfactory flow properties within cell configurations in which the membrane of the present invention is particularly designed for use, the membrane should possess flow-channeling convolutions.

Any attempt to mechanically corrugate a microporous membrane, such as, for example, that disclosed and claimed in the above-denoted copending application of James L. Bailey and Robert F. McCune, causes an intolerable decrease in membrane efficiency since many of the pores are physically collapsed. Accordingly, a system for producing a corrugated microporous membrane was devised wherein said membrane is produced in a corrugated configuration in situ.

It has been found that excellent separation results may be achieved by employing the distillation apparatus described in the above-denoted Rodgers U.S. patent application when the mocropermeable membrane has a pore volume of at least 50 percent and preferably greater than 60 percent and the pore diameter distribution range falls substantially between 0.5 to 1.5 microns with preferably more than 75 percent of the pores falling within this range and a majority of the pores falling within the 0.5 to 1.0 micron range. Utilization of a membrane containing a pore size distribution within this range optimizes the results achieved in the above-denoted distillation environment under optimum operating parameters but should not be considered a contraindication of the use of membranes with a pore diameter distribution range outside the above-disclosed range since certain separation operations require pore diameters of less than 0.5 micron. It will be appreciated that while a predominance of pores in the 0.5 to 1.0 micron diameter range is considered to provide the best mode of operation, adequate results may be obtained when the membranes possess a pore size distribution wherein over 75 percent of the pores are in the 0.5 to 2.0 micron range with less than 5% of the pores having a diameter greater than the microns. It will be accordingly evident that optimal results with a given set of operating parameters may be achieved by selecting a micropermeable membrane comprising a narrow distribution of pore diameters within the above-denoted 0.5 to 2.0 micron range.

The process of the present invention requires that any deformable base material which is capable of permanently retaining any deformation physically imparted thereto be subjected to suitable deforming means, such as, for example, a thermomechanical means in the form of heated rotating dies, heated platens, etc., which will impart to said material a given number per unit length of convolutions of a predetermined amplitude substantially identical to those desired in the ultimately produced membrane. To provide satisfactory results in the above-denoted distillation apparatus, ideally, the membrane should possess at least eight convolutions per inch and preferably about 72 convolutions per inch. Since some shrinkage occurs, the amplitude of the convolutions imparted to the base material should be slightly greater than that desired in the ultimate membrane. About 3 to 5 mils amplitude for the convolutions in the base material provides a satisfactory amplitude to the convolutions of the ultimate membrane. The amplitude of the convolutions of the ultimate membrane should be about one-half the thickness of the membrane. Material such as the polycarbonates, e.g., Lexan; polyphenylene sulfone; polystyrene, etc. have been found ideal to provide this function. Lexan polycarbonate is the preferred material. The corrugated base material is coated with a solution of a silane coupling agent, which insures an adequate bond, specifically γ-aminopropyltriethoxysilane, in about a 2 percent solution. This material may be obtained from the Union Carbide Corporation under the designation A 1100 and may be used in concentrations of as little as 0.25 percent. While any silane solvent may be used as long as it does not deleteriously effect the base material, the preferred solvent is isopropanol and application to the base material may be carried out by flow coating, swabbing, etc., to provide a thin, almost monomolecular layer of the silane on the base material. The silane is allowed to dry on the base material and provides a coating thereon which identically follows the contour of the convolutions thereof. Subsequently, a coating of a room temperature vulcanizable silicone rubber such as Silastic RTV 732, sold by Dow Chemical Company; types 102 or 108, sold by General Electric Company; etc., is spread on a rigid member such as, for example, a piece of glass, or the like, in a thickness of about one-thirty seconds inch, which is, by no means, critical, but must, of course, be thicker than the amplitude of the convolutions imparted to the base material, and the silane coated surface of the base material is contacted therewith. The silicone rubber is used in the form of a one hundred percent solids material in the fluid state and readily crosslinks at room temperature when it contacts ambient moisture. It is allowed to cure whereupon a composite structure results. The composite structure is contacted with a solvent for the base material which, in the case of Lexan might be, for example, dichloromethane. The prime parameter in selecting the solvent for the base material is that it be a nonsolvent for the remaining elements of the mold member. Other such solvents include ethylene dichloride, dimethyl acetamide, acetone, etc. Upon removal of the base material, the remaining mold member may be utilized according to, for example, the process of the above-mentioned Bailey and McCune application, to produce a microporous corrugated polyvinylidene fluoride membrane. Briefly, this involves contacting the silane surface of the mold member with a solution of polyvinylidene fluoride in a suitable solvent, such as dimethyl acetamide. The polyvinylidene fluoride coated mold member is then immersed in a bath which is a nonsolvent for the polyvinylidene fluoride but which is miscible with the already present polyvinylidene fluoride solvent, for example, the above-mentioned dimethyl acetamide, to produce a gelled membrane. Such nonsolvent materials include methanol, ethanol, propanol and other higher boiling alcohols, 2 nonane, ethylene glycol monoethyl ether and its ester derivatives, etc., methanol being preferred. The gelled membrane, still adhered to he silane-modified mold member is then baked and stripped from the mold. Empirically, it has been found that the membrane possesses the requisite pore size distribution and conforms substantially identically to the deformation originally imparted to the heretofore removed base material.

As mentioned above, the polymeric materials used in forming the membranes of the present invention are high molecular weight, film-forming polymers of vinylidene fluoride, the homopolymers being preferred. As illustrative of these materials, mention is made of the polyvinylidene fluoride polymeric materials commercially available from Pennsylvania Salt Manufacturing Company, 3 Penn Center Plaza, Philadelphia, Pennsylvania, under the trade name "Kynar" (a homopolymer containing 59 percent fluorine). Such material may be obtained and used, for example, in the form of a 5 micron size particle powder under the name "Kynar" 301 powder.

The copolymeric materials which may be used in the present invention contain a major proportion of vinylidene fluoride and, preferably will contain at least about 90 percent vinylidene fluoride. The materials which may be copolymerized with the vinylidene fluoride are ethylenically unsaturated materials which preferably have no functional group other than the

group. Such materials may be illustrated by ethylene, propylene, butylene, vinyl chloride, vinyl fluoride, vinylbromide, vinylidene chloride, ethyl acrylate, methylmethacrylate, etc. The term polymeric vinylidene fluoride as used in the appended claims is intended to include the aforementioned copolymeric materials as well as the preferred homopolymeric material as mentioned hereinbefore.

To form the films of the present invention it is necessary to form a "solution"of the polymeric vinylidene fluoride, as aforementioned. Polymeric vinylidene fluoride does not form true solutions with a solvent but, as indicated in U.S. Pat. No. 3,211,687 to Caperon et al. forms pseudo-solutions with a number of solvents. Such solvents comprise dimethyl acetamide, dimethyl sulfoxide, tetramethyl urea, diethyl acetamide, and mixtures thereof, the preferred material being dimethyl acetamide. These solvents can be used to form suitable psuedo-solutions which at room temperature can be effectively formed into polymeric vinylidene fluoride films. While other materials can be used to effect a solvent solution of the polymeric vinylidene fluoride, at, for example, high temperatures, many such solvents produce solutions which gel at ambient temperatures and accordingly are of lesser practical value in preparing the film of the present invention.

The solution of polyvinylidene fluoride, to be used in the present invention, may be prepared by placing a selected solvent in a container equipped with an agitator, heating the solvent at a temperature within the range of about 28° to 62° C. and adding the polyvinylidene fluoride, in powder form, to the heated agitated solvent. Alternatively, the polymeric vinylidene fluoride may be admixed with the solvent prior to heating to 28° to 62° C. The heating and agitation is continued, in either case, until apparent solution is obtained. Many types of apparatus for effecting the solutions, under the conditions specified, are well known and these may be illustrated by a paint mill or a colloid mill. Raising the temperature of the polyvinylidene fluoride solution, prior to casting into a film, to 34° C., has been found to produce a membrane possessing a pore size distribution, predominantly in the 0.5 to 1.0 micron range. It will be accordingly appreciated that micropermeable membranes comprising polyvinylidene fluoride with substantially any desired pore size distribution may be formed by selecting an appropriate maximum temperature to which the polyvinylidene fluoride solution is elevated prior to casting, which is more fully discussed in the Bailey and McCune application, supra.

As reported in the last-mentioned Caperon et al. patent, the solvents can dissolve and form solutions containing as high as 30 percent, by weight, polymeric vinylidene fluoride. However, for forming the microporous films of the present invention, it is preferred that the solutions have a percent polymer in the range from about 15 to 25 percent, by weight, and most preferably, 20 percent by weight.

The polyvinylidene fluoride solution is applied to the silane modified surface of the mold member by any suitable coating technique. It is preferred to doctor the material onto the mold member to provide a substantially consistent thickness throughout the membrane when measured at either the peak of triangle of the convolutions, respectively. OPtimum thickness on a wet basis at the convolution peaks, is about 0.020 inch, which produces a membrane approximately 4.5–6.5 mils. in thickness on a dry basis, again measured at the convolution peaks. As denoted above, the mold member with the adherent polyvinylidene fluoride solution is contacted with in a liquid which is nonsolvent for the polyvinylidene fluoride, but which is miscible with the original polyvinylidene solvent. The composite mold member-membrane structure is allowed to remain in contact with the nonsolvent until the gel structure achieves sufficient physical strength and substantial extraction of the polyvinylidene fluoride solvent is assured. Approximately 10 minutes may be employed for this operation.

Next, the mold member with the adherent membrane is oven-dried and the ultimate corrugated membrane is stripped from the mold member. It has been found that stripping may be facilitated if it is carried out in an aqueous environment.

The 4.5 to 6.5 mil. thick membrane is considered to be of sufficient thickness to be selfsupporting, but is not so thick that vapor transmission efficiency characteristics of the membrane would be detrimentally effected. Ideally, the oven-drying step will be executed at a temperature insufficient to cause the polymeric vinylidene fluoride to fuse its fusion temperature being approximately 175° C. The baking operation anneals the film thereby removing casting strains and sets the film in a fixed geometrical structure. A baking time of about 15 minutes generally is sufficient to provide the desired results.

The instant invention will be better understood by a consideration of the Example which follows. Included in the Example will be a discussion of the figures of the drawings which sets forth the general procedures to be followed in the practice of the present invention; illustrates membranes made according to the present invention both with and without silane modification of the mold member; and demonstrates the pore size distribution of membranes of the present invention.

EXAMPLE 1

A polyvinylidene fluoride membrane having a pore volume of approximately 70 percent wherein at least 75 percent of the pores have a pore diameter from between 0.5 to 1 micron is prepared according to the following procedure:

A 1 mil. thick sheet of "Lexan" polycarbonate material is run through an embossing apparatus comprising a heated embossing die possessing 72 convolutions of about 5 mil. depth per inch and a silicone rubber backing roll. The embossed Lexan is then swab-coated with a 2 percent solution of $\gamma$-aminopropyltnethoxysilane designated as "A1100" in isopropanol. The silane coated Lexan is allowed to air dry for 30 minutes. Next, a glass plate is doctor-coated with a room temperature vulcanizable silicone rubber designated as "GE Type 102" in a thickness of approximately one thirty second of an inch. Immediately, the silane modified surface of the Lexan base material is contacted with the room temperature vulcanizable silicone rubber and the rubber is allowed to cure at room temperature by placing it in an environment kept at approximately 80° C. for 24 hours. The entire composite structure is then immersed in a bath of methylene dichloride which dissolves the Lexan from the structure thereby producing a silane modified silicone rubber mold.

A 20 percent by weight solution of polyvinylidene fluoride is prepared by mixing 10 gms. of "Kynar 301" powder in 40 gms. of dimethyl acetamide at 34° C. The mixture is stirred for one hour to assure solvation of the polyvinylidene fluoride. The polyvinylidene fluoride is then doctored onto the silane modified mold member in a wet thickness of 0.020 inch, and immersed in a nonsolvent bath of methanol for 10 minutes. After removing it from the methanol the membrane-mold structure is air-dried for 30 minutes and baked in an oven at 150° C. for 15 minutes. The membrane is then physically stripped from the mold member and possessed convolutions substantially identical to those imparted to the original Lexan base material.

Figure 2:
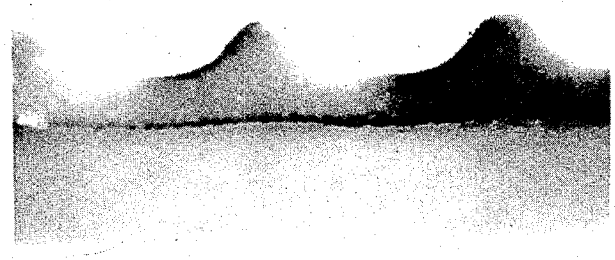
FIG. 2 is a reproduction of a photomicrograph of a cross section of a polyvinylidene fluoride microporous membrane produced according to the present invention.
Figure 3:
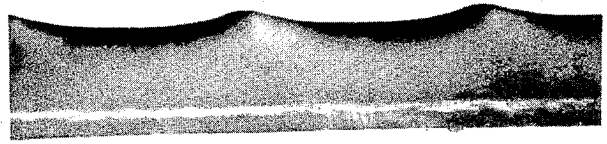
FIG. 3 is a reproduction of a photomicrograph of a cross section of a prematurely released polyvinylidene fluoride microporous membrane produced according to the process of the present invention with the exception that the silane application was omitted.

Fig. 2 is a photomicrograph of the membrane prepared according to the present example and evidences well-defined convolutions which are beneficial for use in desalination apparatuses as denoted above. On the other hand, a repetition of the instant example, without the silane modification step, produces the membrane depicted in FIG. 3. The absence of definition of the convolutions is considered to be due to a premature separation of the gel structure from the mold member.

The pore size distribution of the product of Example 1 has been determined using the Skau-Ryska high pressure mercury intrusion test, employing an Aminco-Winslow Porosimeter commercially available from American Instrument Co., Silver Springs, Maryland, and the data from the test is graphically reproduced in the curve of Fig. 4. The curve represents the plotting of the intrusion of mercury in cc's, as the ordinate, against the pressure applied to the mercury in psi, as the abscissa. The abscissa may be mathematically converted to represent pore size diameter employing the expression $d = 2r$ wherein $d$ is pore size diameter in microns ($\mu$) and $$r = (-2\gamma \cos. \phi)/p$$

wherein $\gamma$ is the surface tension of mercury (Hg), i.e., 69.6181 pounds microns per square inch; $\phi$ is the contact angle of mercury against the microporous polyvinylidene fluoride, i.e., about 130°; and p is the pressure applied in pounds per square inch. The curve clearly indicates, by the area beneath the peak, that over 75 percent of the pores within the film have a pore size within the range of 0.5 to 1 micron.

While the present invention has been directed toward a microporous polymeric vinylidene fluoride film particularly adapted for use in the distillation apparatus of the afore-mentioned copending application Ser. No. 456,040, the invention is in no way limited thereto. Such microporous films may also be used in other areas where microporous films are conventionally employed, such as microbiological applications; the filtering of oil used in the lubrication of miniature bearings; the filtering of rocket engine fuel; organic solvent filtration, etc. The present invention specifically provides a microporous film of polyvinylidene fluoride which exhibits a sufficiently high degree of pore size uniformity and pore volume so as to provide for the efficient employment of the film in various filtration or liquid purification processes.

Since certain changes may be made in the above process and product without departing from the scope of the invention herein involved, it is intended that all matter contained in the above description and shown in the accompanying drawing shall be interpreted as illustrative and not in a limiting sense.

What is claimed is:

1. A mold particularly adapted for the formation of polyvinylidene fluoride microporous membranes which comprises, in order:
    a. a rigid support member;
    b. a layer of vulcanized silicone rubber, the surface of which contains a predetermined configuration; and
    c. a thin coating of $\gamma$-aminopropyltriethoxysilane which follows the configuration of the silicone rubber layer.

2. The invention of claim 1 wherein said configuration comprises at least eight convolutions per inch.

* * * * *